(12) United States Patent
Hasegawa

(10) Patent No.: US 11,643,560 B2
(45) Date of Patent: May 9, 2023

(54) INK, INK STORED CONTAINER, INKJET PRINTING METHOD, AND INKJET PRINTING APPARATUS

(71) Applicant: RICOH COMPANY, LTD., Tokyo (JP)

(72) Inventor: Ken Hasegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 261 days.

(21) Appl. No.: 17/095,916

(22) Filed: Nov. 12, 2020

(65) Prior Publication Data

US 2021/0277262 A1 Sep. 9, 2021

(30) Foreign Application Priority Data

Mar. 6, 2020 (JP) .............................. JP2020-038374

(51) Int. Cl.
*C09D 11/08* (2006.01)
*B41J 2/175* (2006.01)
*C09D 11/322* (2014.01)
*C09D 11/328* (2014.01)

(52) U.S. Cl.
CPC ............ *C09D 11/08* (2013.01); *B41J 2/17503* (2013.01); *C09D 11/322* (2013.01); *C09D 11/328* (2013.01)

(58) Field of Classification Search
CPC ..... C09D 11/328; C09D 11/50; C09D 11/102; C09D 11/16; C09D 11/17; C09D 11/30; B41J 2/2117; C09B 67/0041; A61Q 5/065
See application file for complete search history.

(56) References Cited

U.S. PATENT DOCUMENTS

| | | | | |
|---|---|---|---|---|
| 4,613,559 A * | 9/1986 | Ober | ................... | G03G 9/0804 430/109.3 |
| 4,649,064 A * | 3/1987 | Jones | ................... | B41M 5/5236 427/256 |
| 5,073,498 A * | 12/1991 | Schwartz | ........... | G01N 33/5094 436/63 |
| 5,723,218 A * | 3/1998 | Haugland | ............ | G01N 33/533 428/407 |
| 6,106,999 A * | 8/2000 | Ogiso | ..................... | G03F 7/029 548/405 |
| 6,203,604 B1 * | 3/2001 | Kashiwazaki | ...... | C09B 67/0041 106/31.27 |
| 7,014,973 B2 * | 3/2006 | Qian | ...................... | G03G 9/132 430/119.2 |
| 9,465,036 B2 * | 10/2016 | Winnik | .............. | G01N 33/6848 |
| 9,724,940 B1 * | 8/2017 | Ueki | ...................... | C09D 11/38 |
| 2002/0198289 A1 * | 12/2002 | Gummeson | .......... | C09D 11/101 523/400 |
| 2005/0107492 A1 * | 5/2005 | Sukhna | ................. | C09D 11/16 523/160 |

(Continued)

FOREIGN PATENT DOCUMENTS

| | | |
|---|---|---|
| JP | 08-239610 | 9/1996 |
| JP | 3740243 | 11/2005 |
| JP | 2008-063546 | 3/2008 |

*Primary Examiner* — John Zimmermann
(74) *Attorney, Agent, or Firm* — Grüneberg and Myers, PLLC

(57) ABSTRACT

Provided is an ink including: water; a colorant; and an organic solvent, wherein the colorant is resin particles dyed with a fluorescent dye, wherein the resin particles contain a urethane resin, and wherein pH of the ink is from 9 through 11.

18 Claims, 2 Drawing Sheets

(56) References Cited

U.S. PATENT DOCUMENTS

2010/0086683 A1* 4/2010 Birau .................... C09D 11/34
                                                        427/256
2020/0206096 A1* 7/2020 Bowker ............... A61K 8/8164
2020/0248019 A1* 8/2020 Tozuka ................. C09D 11/17

* cited by examiner

INK, INK STORED CONTAINER, INKJET PRINTING METHOD, AND INKJET PRINTING APPARATUS

CROSS-REFERENCE TO RELATED APPLICATIONS

The present application claims priority under 35 U.S.C. § 119 to Japanese Patent Application No. 2020-038374 filed Mar. 6, 2020. The contents of which are incorporated herein by reference in their entirety.

BACKGROUND OF THE INVENTION

Field of the Invention

The present disclosure relates to an ink, an ink stored container, an inkjet printing method, and an inkjet printing apparatus.

Description of the Related Art

In recent years, there have been increasing needs for fluorescent color inks in order to improve the appeal power of posters or catalogs. Organic fluorescent colorants that develop vivid colors under daylight are used as such fluorescent color inks. Many of such organic fluorescent colorants have a high color developability in the acid region.

Commonly, water-based inks used in inkjet printing methods are pH-adjusted to weak alkaline levels in order to, for example, prevent corrosion of head members. When inkjet water-based fluorescent color inks are pH-adjusted to weak alkaline levels in order to ensure corrosion resistance of head members, there is a problem that the fluorescent property of the fluorescent color inks is spoiled.

In order to overcome this problem, for example, a proposed inkjet ink contains at least a pigment, a dispersant, water, resin particles dyed with a fluorescent dye and having an average particle diameter of from 50 nm through 200 nm, and an emulsion of self-emulsifying polyurethane (for example, see Japanese Unexamined Patent Application Publication No. 2008-63546).

SUMMARY OF THE INVENTION

According to one aspect of the present disclosure, an ink contains water, a colorant, and an organic solvent. The colorant is resin particles dyed with a fluorescent dye. The resin particles contain a urethane resin. The pH of the ink is from 9 through 11.

DESCRIPTION OF THE EMBODIMENTS (Ink)

Figure 1:
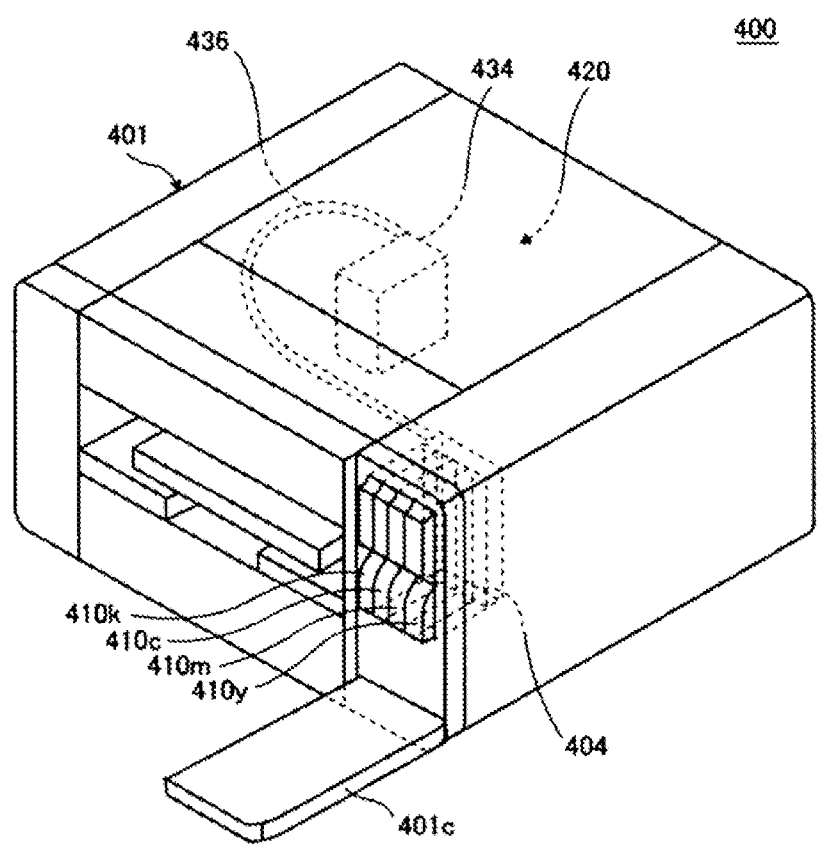
FIG. 1 is a schematic view illustrating an example of an inkjet printing apparatus of the present disclosure.

An ink of the present disclosure includes water, a colorant, and an organic solvent. The colorant is resin particles dyed with a fluorescent dye. The resin particles contain a urethane resin. The pH of the ink is from 9 through 11. The ink further contains other components as needed.

The present disclosure has an object to provide an ink that is suitable for inkjet applications, ensures an excellent corrosion resistance for head members, and has a high fluorescent property.

The present disclosure can provide an ink that is suitable for inkjet applications, ensures an excellent corrosion resistance for head members, and has a high fluorescent property.

The ink is substantially free of any other colorant than the resin particles dyed with the fluorescent dye.

Here, "substantially free of any other colorant than the resin particles dyed with the fluorescent dye" means that the proportion of any other colorant than the resin particles dyed with the fluorescent dye in the ink is 0.5% by mass or less. The ink may contain any other colorant than the resin particles dyed with the fluorescent dye so long as the proportion of such a colorant is of an impurity level.

Existing water-based inks containing resin particles dyed with fluorescent dyes undergo ink viscosity thickening and discoloration when pH of the inks is adjusted to higher than 8, because dye desorption occurs at such a pH level. When pH of the inks is 8 or lower, head members are eluted in the inks. Therefore, there is a need for adjusting pH of the inks to weak alkaline levels.

It has been found that an ink containing water, a colorant, and an organic solvent, wherein the colorant is resin particles dyed with a fluorescent dye, wherein the resin particles contain a urethane resin, and wherein the pH of the ink is from 9 through 11 can protect the dyed surface of the resin particles, can suppress desorption of the fluorescent dye from the resin particles, can ensure an excellent corrosion resistance for head members, and can have a high fluorescent property.

<Colorant>

A fluorescent dye is used as the colorant. The fluorescent dye is not particularly limited and may be appropriately selected depending on the intended purpose so long as the fluorescent dye absorbs excitation light having a predetermined wavelength and emits fluorescent light. Examples of the fluorescent dye include: C.I. basic red 1, 1:1, 2, 9, 11:1, 12, 13, 14, and 17; C.I. basic violet 1, 3, 7, 10, 11:1, and 14; C.I. acid red 51, 52, 77, 87, 92, 94, and 289; C.I. acid yellow 3, 7, 73, 184, and 250; C.I. direct yellow 11, 24, 26, 87, 100, 132, and 147; C.I. direct orange 26, 29, 29:1, and 46; C.I. direct red 1, 13, 17, 239, 240, 242, and 254; C.I. solvent yellow 33, 44, 82, 94, 98, 116, 131, 135, and 160:1; C.I. solvent red 43, 44, 45, 48, 49, 60, and 72; C.I. solvent blue 5; C.I. solvent green 7; C.I. disperse yellow 82; and C.I. basic yellow 40. One of these fluorescent dyes may be used alone or two or more of these fluorescent dyes may be used in combination. Among these fluorescent dyes, C.I. acid red 52, C.I. acid red 87, C.I. acid red 92, C.I. basic violet 10, basic violet 11, basic violet 11:1, C.I. acid yellow 3, and C.I. acid yellow 73 are preferable because these fluorescent dyes have a good water solubility even when pH is 9 or higher, and C.I. basic violet 10, basic violet 11, and basic violet 11:1 are more preferable because these fluorescent dyes can have a strong ionic bond with anionic resins when anionic resins are dyed with these fluorescent dyes.

Resin particles may be dyed with the dye at any of "during emulsion polymerization of the resin particles" or "after polymerization". Preferable dyeing conditions are stirring at the atmospheric pressure or under pressurization at from 40 degrees C. through 110 degrees C. for from 1 hour through 5 hours. The amount of the dye to be used is preferably 0.01 parts by mass or greater but 10 parts by mass or less and more preferably 0.1 parts by mass or greater but 5 parts by mass or less relative to 100 parts by mass of an emulsion polymer (solid component).

The proportion of the fluorescent dye is preferably 0.2% by mass or greater but 2% by mass or less and more preferably 0.3% by mass or greater but 1.5% by mass or less relative to the total amount of the ink. When the proportion of the fluorescent dye is 0.2% by mass or greater, image saturation is good. When the proportion of the fluorescent dye is 2% by mass or less, a good fluorescent property can be obtained.

<Resin Particles>

Resin particles having a film forming property are used as the resin particles. The film forming property means a property of emulsion-form resin particles dispersed in water to form a resin coating film when the water of the water-based emulsion is evaporated.

Such resin particles serve to form a coating film when volatile components of the ink evaporate and to make the colorant contained in the ink firmly adhere to a print medium. This makes it possible to realize an image having an excellent scratch resistance.

The kind of the resin of the resin particles is not particularly limited and may be appropriately selected depending on the intended purpose. Examples of the kind of the resin include urethane resins, polyester resins, acrylic resins, vinyl acetate resins, styrene resins, butadiene resins, styrene-butadiene resins, vinyl chloride resins, acrylic-styrene-based resins, and acrylic-silicone resins. Among these resins, urethane resins and acrylic resins are preferable, and combined use of urethane resins an acrylic resins is particularly preferable in terms of fixability.

The acid value of urethane resins is preferably 10 mgKOH/g or higher and more preferably 45 mgKOH/g or higher because a good fluorescent property of the fluorescent dye can be obtained.

The acid value is defined as the amount (mg) of KOH needed to neutralize 1 g of a urethane resin.

The resin particles form a coating film at room temperature. Therefore, the minimum film forming temperature of the resin particles is preferably 30 degrees C. or lower and more preferably 10 degrees C. or lower. The minimum film forming temperature means the lowest temperature at which a resin emulsion obtained by dispersing the resin particles in water and thinly flow-cast over a metal plate of, for example, aluminum forms a transparent continuous film when the temperature of the resin emulsion is gradually elevated. Examples of such resin particles include LANDY PL SERIES available from Miyoshi Oil & Fat Co., Ltd.

The volume average particle diameter of the resin particles is preferably 5 nm or greater but 200 nm or less and more preferably 10 nm or greater but 100 nm or less.

Resin particles having a single particle structure may be used. For example, when there are alkoxysilyl groups in the emulsion particles, along with mutual fusion of the emulsion particles due to water evaporation in the coating film forming process, the alkoxysilyl groups contact any residual water and hydrolyze to form silanol groups. Further, any residual silanol groups can react with alkoxysilyl groups or can mutually react to form a strong crosslinked structure based on siloxane bonds. In this way, with any reactive functional groups copresent in the resin particles, it is possible to form a network structure by allowing such functional groups to react in the film forming process, without adding a curing agent.

The resin particles can be obtained by a known method of, for example, allowing an unsaturated vinyl monomer (unsaturated vinyl resin) to undergo emulsion polymerization in water in which a polymerization catalyst and an emulsifier are present.

The proportion of the resin particles is preferably 0.5% by mass or greater but 50% by mass or less and more preferably 10% by mass or greater but 40% by mass or less relative to the total amount of the ink. In this proportion range of the resin particles, an ink having a good fixability and a high fluorescent property can be obtained.

<Dispersion Aid>

It is preferable that the ink contain a dispersion aid.

When the amount of the dye is increased, the saturation of a printed matter is improved, but on the other hand, the dye attached on the resin inhibits dispersibility of the resin in water and degrades storage stability. Hence, a polyacrylic acid salt can be suitably used as the dispersion aid of the resin. This makes it possible to satisfy both of a high saturation and a high storage stability.

The salt of the polyacrylic acid salt is preferably an alkali metal and more preferably sodium. The weight average molecular weight of the polyacrylic acid salt is preferably from 3,000 through 10,000.

The weight average molecular weight of the polyacrylic acid salt can be measured by, for example, gel permeation chromatography (GPC).

<Organic Solvent>

In order to prevent ink drying, an organic solvent is used for, for example, improvement of dispersion stability. A water-soluble organic solvent is preferable as the organic solvent.

Examples of the water-soluble organic solvent include polyvalent alcohols, polyvalent alcohol alkyl ethers, polyvalent alcohol aryl ethers, nitrogen-containing heterocyclic compounds, amides, amines, sulfur-containing compounds, propylene carbonate, and ethylene carbonate.

Examples of polyvalent alcohols include glycerin, 1,3-butanediol, 3-methyl-1,3-butanediol, 1,5-pentanediol, 1,6-hexanediol, ethylene glycol, diethylene glycol, triethylene glycol, tetraethylene glycol, polyethylene glycol, propylene glycol, dipropylene glycol, tripropylene glycol, polypropylene glycol, hexylene glycol, trimethylolethane, trimethylolpropane, 1,2,3-butanetriol, 1,2,4-butanetriol, 1,2,6-hexanetriol, 2-ethyl-1,3-hexanediol, and petriol.

Examples of polyvalent alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of polyvalent alcohol aryl ethers include ethylene glycol monophenyl ether, and ethylene glycol benzyl ether.

Examples of nitrogen-containing heterocyclic compounds include 2-pyrrolidone, N-methyl-2-pyrrolidone, N-hydroxyethyl-2-pyrrolidone, 1,3-dimethyl imidazolidinone, ε-caprolactam, and γ-butyrolactone.

Examples of amides include acetamide, dimethyl formamide, and diethyl acetamide.

Examples of amines include monoethanol amine, diethanol amine, triethanol amine, monoethyl amine, diethylamine, and triethyl amine.

Examples of sulfur-containing compounds include dimethyl sulfoxide, sulfolane, and thiodiethanol.

Among these water-soluble organic solvents, glycerin, diethylene glycol, 1,3-butanediol, 3-methyl-1,3-butanediol, and 2-ethyl-1,3-hexanediol are preferable. These water-soluble organic solvents have an excellent effect on prevention of dischargeability degradation due to solubility and water evaporation. Moreover, these water-soluble organic solvents can produce an ink excellent in storage stability and discharging stability.

The ink of the present disclosure may contain as needed, any other water-soluble organic solvent such as sugars and derivatives of sugars in combination with the organic solvent described above. Sugars are mainly used in order to improve drying resistance, and examples of sugars include monosaccharides, disaccharides, oligosaccharides (including trisaccharides and tetrasaccharides), and polysaccharides, or derivatives of these sugars. Specific examples of sugars include glucose, mannose, fructose, ribose, xylose, trehalose, and maltotriose. Polysaccharides mean sugars in a broader sense of the term, and encompass substances widely present in the natural world, such as α-cyclodextrin and cellulose.

Examples of derivatives of sugars include reducing sugars and oxidizing sugars of the sugars described above. Among these sugars and derivatives of sugars, sugar alcohols are preferable. Specific examples of sugar alcohols include maltitol and sorbit.

The proportion of the sugar is preferably 0.1% by mass or greater but 40% by mass or less and more preferably 0.5% by mass or greater but 30% by mass or less relative to the total amount of the ink.

<Water>

The water is not particularly limited and may be appropriately selected depending on the intended purpose. Examples of the water include: pure water such as ion-exchanged water, ultrafiltrated water, reverse osmotic water, and distilled water; and ultrapure water. One of these kinds of water may be used alone or two or more of these kinds of water may be used in combination.

The proportion of water in the ink has no particular limit and can be suitably selected to suit to a particular application. In terms of the drying property and discharging reliability of the ink, the proportion is preferably from 10 to 90 percent by mass and more preferably from 20 to 60 percent by mass.

<Other Components>

Examples of the other components include a surfactant, a foam suppressant, a permeation agent, a pH adjustor, a preservative and a fungicide, and a corrosion inhibitor.

—Surfactant—

A surfactant is not particularly limited, and may be appropriately selected depending on the intended purpose from surfactants that do not spoil dispersion stability irrespective of the combination of, for example, the colorant and the organic solvent. Particularly, for printing on a print medium, a fluorosurfactant and a silicone surfactant that have a low surface tension and a high leveling property are suitable. Particularly, a fluorosurfactant is preferable.

As the fluorosurfactant, for example, perfluoroalkyl sulfonic acid compounds, perfluoroalkyl carboxylic acid compounds, perfluoroalkyl phosphoric acid ester compounds, perfluoroalkyl ethylene oxide adducts, and polyoxyalkylene ether polymer compounds containing a perfluoroalkyl ether group in a side chain are particularly preferable because these fluorosurfactants have a low foamability.

Examples of the perfluoroalkyl sulfonic acid compounds include perfluoroalkyl sulfonic acid and perfluoroalkyl sulfonate.

Examples of the perfluoroalkyl carboxylic acid compounds include perfluoroalkyl carboxylic acid and perfluoroalkyl carboxylate.

Examples of the perfluoroalkyl phosphoric acid ester compounds include perfluoroalkyl phosphoric acid ester and salts of perfluoroalkyl phosphoric acid ester.

Examples of the polyoxyalkylene ether polymer compounds containing a perfluoroalkyl ether group in a side chain include sulfuric acid ester salt of polyoxyalkylene ether polymers containing a perfluoroalkyl ether group in a side chain, and salts of polyoxyalkylene ether polymers containing a perfluoroalkyl ether group in a side chain.

Examples of the counterion of the salt of these fluorosurfactants include Li, Na, K, $NH_4$, $NHaCH_2CH_2OH$, $NH_2(CH_2CH_2OH)_2$, and $NH(CH_2CH_2OH)_3$.

As the fluorosurfactant, an appropriately synthesized product may be used or a commercially available product may be used. Examples of the commercially available product include: SURFLON SERIES (S-111, S-112, S-113, S-121, S-131, S-132, S-141, and S-145) available from AGC Inc.; FLUORAD SERIES (FC-93, FC-95, FC-98, FC-129, FC-135, FC-170C, FC-430, and FC-431) available from Sumitomo 3M Limited; MEGAFAC SERIES (F-470, F-1405, and F-474) available from DIC Corporation; ZONYL TBS, FSP, FSA, FSN-100, FSN, FSO-100, FSO, FS-300, and UR available from Du Pont K.K.; FT-110, FT-250, FT-252, FT-400S, FT-150, and FT-400SW available from Neos Company Limited; and PF-151N available from Omnova Solutions Inc. Among these fluorosurfactants, a fluorosurfactant represented by General formula (1) below is preferable.

$C_nF_{2n+1}$—$CH_2CH(OH)CH_2O$—
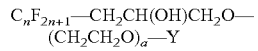 [General formula (1)]

In General formula (1), n represents an integer of from 2 through 6, a represents an integer of from 15 through 50, and Y represents —$C_bH_{2b+1}$ (where b represents an integer of from 11 through 19), or $CH_2CH(OH)CH_2$—$C_mF_{2m+1}$ (where m represents an integer of from 2 through 6).

Examples of the fluorosurfactant represented by General formula (1) include compounds of the structures described below. $C_4F_9$—$CH_2CH(OH)$ $CH_2O$—$(CH_2CH_2O)_{23}$—$CH_2CH(OH)$ $CH_2$—$C_4F_9$ $C_4F_9$—$CH_2CH(OH)$ $CH_2O$—$(CH_2CH_2O)_{35}$—$CH_2CH(OH)$ $CH_2$—$C_4F_9$ $C_4F_9$—$CH_2CH(OH)CH_2O$—$(CH_2CH_2O)_{45}$—$CH_2CH(OH)CH_2$—$C_4F_9$ $C_3F_7$—$CH_2CH(OH)$ $CH_2O$—$(CH_2CH_2O)_{23}$—$CH_2CH(OH)$ $CH_2$—$C_3F_7$ $C_6F_{13}$—$CH_2CH(OH)CH_2O$—$(CH_2CH_2O)_{23}$—$CH_2CH(OH)$ $CH_2$—$C_6F_{13}$ $C_4F_9$—$CH_2CH(OH)$ $CH_2O$—$(CH_2CH_2O)_{25}$—$C_{16}F_{33}$ Among these compounds, a compound having the structure described below is particularly preferable.

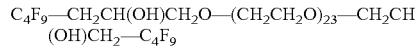

The fluorosurfactant having the structure described above is free of perfluorooctane sulfonic acid (PFOS) and perfluorooctanoic acid (PFOA), and is excellent from the viewpoint of global environmental pollution.

The silicone surfactant is not particularly limited and may be appropriately selected depending on the intended purpose. A silicone surfactant that does not decompose even at a high pH is preferable.

Examples of such a silicone surfactant include side-chain-modified polydimethyl siloxane, both-end-modified polydimethyl siloxane, one-end-modified polydimethyl siloxane, and side-chain-both-end-modified polydimethyl siloxane. A silicone surfactant containing a polyoxyethylene group or a polyoxyethylene polyoxypropylene group as a modifying group is particularly preferable because such a silicone surfactant exhibits a good characteristic as an aqueous surfactant.

As the silicone surfactant, an appropriately synthesized product may be used or a commercially available product may be used. Commercially available products are easily available from, for example, Byk Chemie Japan Co., Ltd., Shin-Etsu Silicone Co., Ltd., and Dow Corning Toray Silicone Co., Ltd.

As the silicone surfactant, a polyether-modified silicone surfactant may also be used. Examples of the polyether-modified silicone surfactant include a compound in which a polyalkylene oxide structure is introduced into the side chain of the Si site of dimethyl siloxane.

The polyether-modified silicone compound is not particularly limited, and an appropriately synthesized product may be used or a commercially available product may be used. Examples of the commercially available product include KF-618, KF-642, and KF-643 available from Shin-Etsu Chemical Co., Ltd.

In addition to the fluorosurfactant and the silicone surfactant, for example, an anionic surfactant, a nonionic surfactant, and an amphoteric surfactant may be used.

Examples of the anionic surfactant include polyoxyethylene alkyl ether acetates, dodecyl benzene sulfonates, succinic acid ester sulfonates, laurates, and polyoxyethylene alkyl ether sulfate salts.

Examples of the nonionic surfactant include acetylene glycol surfactants, polyoxyethylene alkyl ethers, polyoxyethylene alkyl phenyl ethers, polyoxyethylene alkyl esters, and polyoxyethylene sorbitan fatty acid esters.

Examples of the acetylene glycol surfactants include 2,4,7,9-tetramethyl-5-decyn-4,7-diol, 3,6-dimethyl-4-octyne-3,6-diol, and 3,5-dimethyl-1-hexyn-3-ol. Examples of commercially available products of the acetylene glycol surfactants include SURFYNOL SERIES (104, 82, 465, 485, and TG) available from Air Products & Chemicals, Inc.

Examples of the amphoteric surfactants include lauryl aminopropionates, lauryldimethylbetaine, stearyldimethylbetaine, lauryl dihydroxyethyl betaine, lauryldimethylamine oxide, myristyldimethylamine oxide, stearyldimethylamine oxide, dihydroxyethyl laurylamine oxide, polyoxyethylene palm oil alkyldimethylamine oxide, dimethylalkyl (palm) betaine, and dimethyl lauryl betaine. Commercially available products of the amphoteric surfactants are easily available from, for example, Nikko Chemicals Co., Ltd., Nihon Emulsion Co., Ltd., Nippon Shokubai Co., Ltd., Toho Chemical Industry Co., Ltd, Kao Corporation, Adeka Corporation, Lion Corporation, Aoki Oil Industrial Co., Ltd., and Sanyo Chemical Industries, Ltd.

One of the surfactants may be used alone or a plurality of surfactants may be used as a mixture. Any surfactant that is not easily dissolved in the ink if used alone may be solubilized if used as a mixture of a plurality of surfactants and may become able to be present stably.

The proportion of the surfactant in the ink is preferably 0.01% by mass or greater but 4% by mass or less and more preferably 0.1% by mass or greater but 1% by mass or less. When the proportion of the surfactant is 0.01% by mass or greater, the effect as the surfactant is obtained. When the proportion of the surfactant is 4% by mass or less, a good permeability into a print medium and a high image density can be obtained and bleedthrough can be prevented.

—Foam Suppressant—

Fluorosurfactants have a very high surface active property, and bubbles generated by fluorosurfactants may remain without being broken even if a silicone foam suppressant commonly used is added. This may cause, for example, a discharging failure during ink discharging. Hence, in order to suppress generation of bubbles, it is preferable to add one selected from N-octyl-2-pyrrolidone, 2,4,7,9-tetramethyldecane-4,7-diol, and 2,5,8,11-tetramethyldodecane-5,8-diol. When one of the foam suppressants described above and the fluorosurfactant described above are used in combination, it is possible to suppress generation of bubbles and overcome problems due to bubbles.

The surface tension of the ink in the present disclosure is determined based on the ratio between the fluorosurfactant and the foam suppressant. When there is a need for reducing the surface tension of the ink depending on the kind of the print medium, the ratio of the fluorosurfactant needs to be increased. However, naturally, there is the problem of bubbling when the ratio of the fluorosurfactant is increased. Hence, the ratio of the fluorosurfactant is preferably 40% by mass or less and more preferably 30% by mass or less relative to the total amount of the fluorosurfactant and the foam suppressant.

—Permeation Agent—

As the permeation agent, a polyol compound containing from 8 through 11 carbon atoms or a glycol ether compound is suitably used. These compounds have the effects of accelerating the speed of permeation into a print medium and preventing bleed at the same time. These compounds are partially water-soluble compounds having a solubility of 0.1% by mass or greater but 4.5% by mass or less in water of 25 degrees C.

Examples of the polyol compound containing from 8 through 11 carbon atoms include 2-ethyl-1,3-hexanediol, 2,2,4-trimethyl-1,3-pentanediol and 1,2-octanediol.

Examples of the glycol ether compound include polyvalent alcohol alkyl ether compounds and polyvalent alcohol aryl ether compounds.

Examples of the polyvalent alcohol alkyl ether compounds include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyvalent alcohol aryl ether compounds include ethylene glycol monophenyl ether, and ethylene glycol monobenzyl ether.

These permeation agents are components having a boiling point higher than water and liquid at 25 degrees C. The proportion of the permeation agent in the water-based fluorescent color ink is preferably 0.1% by mass or greater but 10% b mass or less and more preferably 0.5% by mass or greater but 5% by mass or less.

—pH Adjustor—

Examples of the pH adjustor include alcohol amines, alkali metal hydroxides, ammonium hydroxides, phosphonium hydroxides, and alkali metal carbonates.

Examples of the alcohol amines include diethanolamine, triethanolamine, and 2-amino-2-ethyl-1,3-propanediol.

Examples of the alkali metal hydroxides include lithium hydroxide, sodium hydroxide, and potassium hydroxide.

Examples of the ammonium hydroxides include ammonium hydroxide, quaternary ammonium hydroxide, and quaternary phosphonium hydroxide.

Examples of the alkali metal carbonates include lithium carbonate, sodium carbonate, and potassium carbonate.

—Preservative and Fungicide—

Examples of the preservative and fungicide include sodium dehydroacetate, sodium sorbate, 2-pyridinethiol-1-oxide sodium, sodium benzoate, and sodium pentachlorophenol.

—Corrosion Inhibitor—

Examples of the corrosion inhibitor include acid sulfite, sodium thiosulfate, antimony thiodiglycolate, diisopropyl ammonium nitrite, pentaerythritol tetranitrate, and dicyclohexyl ammonium nitrite.

The pH of the ink is preferably from 9 through 11. When the pH of the ink is from 9 through 11, the dyed surface of the resin particles is protected, desorption of the fluorescent dye from the resin particles is suppressed, head members are ensured an excellent corrosion resistance, and a high fluorescent property is obtained. When the pH of the ink is higher than 11, the materials of, for example, ink supplying units may be eluted in a large amount. On the other hand, when the pH of the ink is lower than 9, metal components of head members are eluted to cause problems such as deterioration and leakage of the ink and discharging failure.

<Print Medium>

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. Ib be more quantitative, the substrate has a water-absorption amount of 10 mL/m$^2$ or less between the contact and 30 msec$^{1/2}$ after the contact according to Bristow method.

For example, plastic films of polyvinyl chloride resin, polyethylene terephthalate (PET), polypropylene, polyethylene, and polycarbonate are suitably used for the non-permeating substrate.

<Printed Matter>

The printed matter of the present disclosure includes a print medium and an image formed on the print medium with the ink of the present disclosure.

An inkjet printing device and an inkjet printing method are used to print the image on the print medium to obtain the printed matter.

<Ink Stored Container>

An ink stored container of the present disclosure includes a container and the ink of the present disclosure in the container, and further includes other members appropriately selected as needed.

The container is not particularly limited, and, for example, the shape, structure, size, and material of the container may be appropriately selected depending on the intended purpose. Preferable examples of the container include a container including at least an ink bag formed of, for example, aluminum laminate film or resin film.

<Inkjet Printing Apparatus>

The ink of the present disclosure can be suitably applied to various printing devices employing an inkjet printing method such as printers, facsimile machines, photocopiers, multifunction peripherals (serving as a printer, a facsimile machine, and a photocopier), and 3D model manufacturing devices (3D printers, additive manufacturing device).

In the present disclosure, the printing device and the printing method represent a device capable of discharging ink, various processing fluids, etc. to a print medium and a method printing an image on the print medium using the device. The print medium means an article to which the ink or the various processing fluids can be attached at least temporarily.

The printing device may further optionally include a device relating to feeding, conveying, and ejecting the print medium and other devices referred to as a pre-processing device, a post-processing device, etc. in addition to the head portion to discharge the ink.

The printing device and the printing method may further optionally include a heater for use in the heating process and a drier for use in the drying process. For example, the heating device and the drying device heat and dry the top surface and the bottom surface of a print medium having an image. The heating device and the drying device are not particularly limited. For example, a fan heater and an infra-red heater can be used. The print medium can be heated and dried before, during, and after printing.

In addition, the printing device and the printing method are not limited to those producing merely meaningful visible images such as texts and figures with the ink. For example, the printing device and the printing method can produce patterns like geometric design and 3D images.

In addition, the printing device includes both a serial type device in which the liquid discharging head is caused to move and a line type device in which the liquid discharging head is not moved, unless otherwise specified.

Furthermore, in addition to the desktop type, this printing device includes a wide type capable of printing images on a large print medium such as A0, a continuous printer capable of using continuous paper wound up in a roll form as print media.

Figure 2:
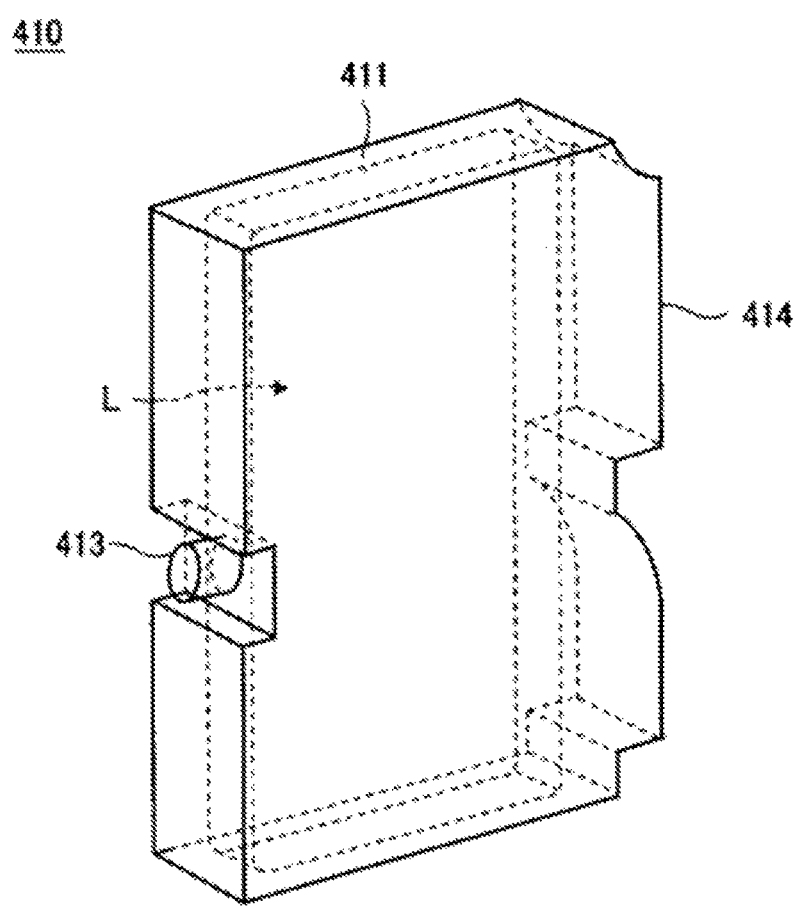
FIG. 2 is a schematic view illustrating an example of an ink stored container.

The inkjet printing apparatus of the present disclosure is described using an example with reference to FIG. 1 and FIG. 2. FIG. 1 is a perspective view illustrating the image printing device. FIG. 2 is a perspective view illustrating the main tank. An image forming apparatus 400 as an example of the inkjet printing apparatus is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packing member such as aluminum laminate film. The ink container 411 is accommodated in a plastic housing unit 414. As a result, the main tank 410 is used as an ink cartridge of each color.

A cartridge holder 404 is disposed on the rear side of the opening when a cover 401c of the main body is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

<Applications>

The applications of the ink of the present disclosure are not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc.

The molded processed product is suitable as a product of molding performed after surface-decoration. Examples thereof are gauges or operation panels of vehicles, office machines, electric and electronic machines, cameras, etc.

Moreover, image forming, recording, printing, etc. in the present disclosure represent the same meaning.

Print media, media, and print target represent the same meaning.

EXAMPLES

The present disclosure will be described below by way of Examples. The present disclosure should not be construed as being limited to these Examples.

Examples 1 to 12, and Comparative Examples 1 to 3

—Production of Ink—

Water, a fluorescent dye, and resin particles presented in Table 1-1 and Table 1-2 were added together and mixed uniformly under stirring at normal temperature (25 degrees C.) and then gradually heated, to dye the resin particles at 80 degrees C. for 1 hour. In the way described above, resin particles dyed with the fluorescent dye were obtained.

Next, the resultant was cooled to room temperature (25 degrees C.), and remaining materials were added to the resultant and further stirred and mixed uniformly for 1 hour. The resultant mixture was subjected to pressure filtration through a polyvinylidene fluoride membrane filter having an average pore diameter of 0.8 micrometers, to remove coarse particles and dust, to obtain inks of Examples 1 to 12 and Comparative Examples 1 to 3. The proportions of the resin particles in Table 1-1 and Table 1-2 are solid component proportions calculated as values of solid components.

Next, the pH of each ink obtained was measured at room temperature (25 degrees C.) with a pH meter (obtained from DKK-TOA Corporation, HM-30R). The results are presented in Table 1-1 and Table 1-2.

TABLE 1-1

| | | Ex. | | | | | | | |
|---|---|---|---|---|---|---|---|---|---|
| | | 1 | 2 | 3 | 4 | 5 | 6 | 7 | 8 |
| Dye | C.I. acid red 52 | | 0.5 | | | 0.7 | | 0.5 | 0.1 |
| | C.I. acid red 92 | | | 0.3 | 1.0 | | 0.7 | | |
| | C.I. basic red 1:1 | 0.3 | | | | | | | |
| | C.I. acid red 87 | | | | | | | | 0.6 |
| | C.I. basic violet 10 | | | | | | | | |
| | C.I. basic violet 11 | | | | | | | | |
| | C.I. acid yellow 73 | | | | | | | | |
| Organic solvent | 1,3-Butanediol | 14.0 | 14.0 | 14.0 | 14.0 | 15.0 | 10.0 | 14.0 | 20.0 |
| | 2-Ethyl-1,3-hexanediol | 2.0 | 2.0 | 2.0 | 2.0 | 2.0 | 2.0 | 2.0 | 2.0 |
| Resin | Urethane resin particles 1 (acid value: 48 mgKOH/g, solid proportion: 34.6% by mass) | 37.6 | 37.6 | 28.9 | 28.9 | 37.6 | 37.6 | | 37.6 |
| | Urethane resin particles 2 (acid value: 12 mgKOH/g, solid proportion: 35.2% by mass) | | | | | | | 28.4 | |
| | Acrylic resin particles 1 (acid value: 157 mgKOH/g, solid proportion: 19.5% by mass) | | | 15.4 | | | | | |
| | Acrylic resin particles 2 (acid value: 18 mgKOH/g, solid proportion: 44.0% by mass) | | | | | | | | |
| Water | Ion-exchanged water | 45.1 | 44.9 | 38.4 | 53.1 | 44.0 | 47.7 | 54.1 | 38.7 |
| pH adjustor | 2-Amino-2-ethyl-1,3-propanediol | 1.0 | 1.0 | 1.0 | 1.0 | 0.7 | 2.0 | 1.0 | 1.0 |
| Dispersion aid | Soda polyacrylate (weight average molecular weight: 6,000) | | | | | | | | |
| Total (% by mass) | | 100.0 | 100.0 | 100.0 | 100.0 | 100.0 | 100.0 | 100.0 | 100.0 |
| pH of ink | | 9.5 | 9.5 | 9.5 | 9.5 | 9.0 | 11.0 | 9.5 | 9.5 |

TABLE 1-2

| | | Ex. | | | | Comp. Ex. | | |
|---|---|---|---|---|---|---|---|---|
| | | 9 | 10 | 11 | 12 | 1 | 2 | 3 |
| Dye | C.I. acid red 52 | | | | | 0.3 | 1.0 | |
| | C.I. acid red 92 | | | | | | | 0.2 |
| | C.I. basic red 1:1 | | | | | | 0.3 | |

TABLE 1-2-continued

|  |  | Ex. 9 | Ex. 10 | Ex. 11 | Ex. 12 | Comp. Ex. 1 | Comp. Ex. 2 | Comp. Ex. 3 |
|---|---|---|---|---|---|---|---|---|
|  | C.I. acid red 87 |  |  |  |  |  |  |  |
|  | C.I. basic violet 10 | 1.0 |  |  |  |  |  |  |
|  | C.I. basic violet 11 |  |  | 1.5 | 1.5 |  |  |  |
|  | C.I. acid yellow 73 |  | 1.0 |  |  |  |  |  |
| Organic solvent | 1,3-Butanediol | 16.0 | 16.0 | 16.0 | 16.0 | 14.0 | 14.0 | 14.0 |
|  | 2-Ethyl-1,3-hexanediol | 2.0 | 2.0 | 2.0 | 2.0 | 2.0 | 2.0 | 2.0 |
| Resin | Urethane resin particles 1 (acid value: 48 mgKOH/g, solid proportion: 34.6% by mass) | 37.6 | 37.6 | 37.6 | 37.6 |  | 37.6 | 37.6 |
|  | Urethane resin particles 2 (acid value: 12 mgKOH/g, solid proportion: 35.2% by mass) |  |  |  |  |  |  |  |
|  | Acrylic resin particles 1 (acid value: 157 mgKOH/g, solid proportion: 19.5% by mass) |  |  |  |  |  |  |  |
|  | Acrylic resin particles 2 (acid value: 18 mgKOH/g, solid proportion: 44.0% by mass) |  |  |  |  | 29.5 |  |  |
| Water | Ion-exchanged water | 42.4 | 42.4 | 41.9 | 41.4 | 53.5 | 45.1 | 43.2 |
| pH adjustor | 2-Amino-2-ethyl-1,3-propanediol | 1.0 | 1.0 | 1.0 | 1.0 | 1.0 |  | 3.0 |
| Dispersion aid | Soda polyacrylate (weight average molecular weight: 6,000) |  |  |  | 0.5 |  |  |  |
| Total (% by mass) |  | 100.0 | 100.0 | 100.0 | 100.0 | 100.0 | 100.0 | 100.0 |
| pH of ink |  | 9.5 | 9.5 | 9.5 | 9.5 | 9.5 | 7.0 | 12.0 |

The details of the components in Table 1-1 and Table 1-2 are as follows.

—Resin—

*Urethane resin particles: obtained from Mitsui Chemicals MC Co., Ltd., TAKELAC W-5661

* Urethane resin particles 2: obtained from Chirika Co., Ltd., RIKABOND SU100N

*Acrylic resin particles 1: obtained from Kusumoto Chemicals, Ltd., NEOCRYL A-1225

*Acrylic resin particles 2: obtained from Kusumoto Chemicals, Ltd., NEOCRYL A-1127

—Dispersion Aid—

*Soda polyacrylate (sodium polyacrylate, with a weight average molecular weight of 6,000, obtained from Toagosei Co., Ltd.)

<Evaluation of Saturation and Fluorescent Property>

The ink produced in each of Examples and Comparative Examples was filled in an inkjet printer (obtained from Ricoh Company, Ltd., IPSIO GX E5500), to print an A4-size full solid image at a print density of 600×300 dpi by one pass.

Plain paper: P-PAPER GF-500 (A4 size, obtained from Cannon Inc.) was used as paper for print test. After the printed image was dried, brightness and saturation were measured with a reflective color spectroscopic colorimetric densitometer (X-RITE EXACT, obtained from X-Rite Inc.).

The measured saturation was evaluated according to the criteria described below.

[Evaluation Criteria for Saturation]

A: The saturation was 70 or higher.

B: The saturation was 60 or higher but lower than 70.

C: The saturation was lower than 60.

The fluorescent property was calculated from the obtained L value, to evaluate the fluorescent property according to the evaluation criteria described below. For calculation of the fluorescent property, a brightness (L2) measured with an M2 light source containing no UV wavelength and a brightness (L1) measured with an M1 light source containing a UV wavelength were used, to calculate the difference (L1-L2) and evaluate the fluorescent property according to the criteria described below.

[Evaluation Criteria for Fluorescent Property]

B: The fluorescent property was 2 or higher.

C: The fluorescent property was 1 or higher but lower than 2.

D: The fluorescent property was lower than 1.

<Evaluation of Fixability>

After twenty-four hours or longer had passed since the image for the evaluation of the fluorescent property described above was printed, a cotton cloth attached on a clock meter (obtained from Toyo Seiki Co., Ltd.) was reciprocated ten times over the printed solid portion, and a transfer optical density (transfer OD) of any stain attached to the cotton cloth that scratched the image was measured with a reflective color spectroscopic colorimetric densitometer (X-RITE EXACT, obtained from X-Rite Inc.), to evaluate fixability according to the criteria described below.

[Evaluation Criteria]

B: The transfer OD was lower than 0.05.

C: The transfer OD was 0.05 or higher but lower than 0.20.

D: The transfer OD was 0.20 or higher.

<Evaluation of Image Water Resistance>

The image printed for the evaluation of the fluorescent property described above was immersed in pure water for 24 hours, and the Lab color difference between the image before immersion and the image after immersion was measured with a reflective color spectroscopic colorimetric densitometer (X-RITE EXACT, obtained from X-Rite Inc.), to evaluate water resistance according to the criteria described below.

[Evaluation Criteria]

A: The Lab color difference was lower than 3.2.

B: The Lab color difference is 3.2 or higher but lower than 25.0.

C: The Lab color difference is 25.0 or higher.

<Evaluation of Storage Stability>

The ink produced in each of Examples and Comparative Examples was poured in a 20 mL glass bottle and left to stand in a thermostat chamber of 70 degrees C. for 2 weeks, and the change ratio of the volume average particle diameter of the ink was calculated based on the difference between the initial volume average particle diameter of the ink and the volume average particle diameter of the ink after storage for 2 weeks, to evaluate storage stability according to the criteria described below. The volume average particle diameter was measured with a UPA-EX150 obtained from Microtrac Corporation. The ink was diluted 250-fold with ion-exchanged water, poured in a measuring cell, and subjected to measurement at 25 degrees C. for 60 seconds. The volume average particle diameter of the ink substantially means the volume average particle diameter of the resin particles contained in the ink.

[Evaluation Criteria]

B: The change ratio of the volume average particle diameter was lower than 10%.

C: The change ratio of the volume average particle diameter was 10% or higher but lower than 20%.

D: The change ratio of the volume average particle diameter was 20% or higher.

<Evaluation of Corrosion Resistance of Metallic Member>

A metallic member (SUS303) was immersed in the ink (30 mL) produced in each of Examples and Comparative Examples and left to stand in a thermostat chamber of 50 degrees C. for 3 weeks, and the corrosion resistance level of the metallic member after leaving to stand was visually evaluated according to the evaluation criteria described below.

[Evaluation Criteria]

B: No corrosion was observed.

C: Slight corrosion was observed, but was a non-problematic level.

D: Corrosion was observed.

From the results of Table 2, it was revealed that Examples 1 to 12 were superior to Comparative Examples 1 to 3 in at least any of corrosion resistance, fluorescent property, storage stability, fixability, saturation, and water resistance.

From, for example, Comparative Examples 1 and 2 and Examples 1 to 3 and 7, it was revealed that dyeing of urethane resin particles having an acid value of 10 mgKOH/g or greater with a fluorescent dye achieved an excellent fluorescent property even when the pH of the ink was adjusted to 9 or higher so as not for any metallic member to be corroded.

From, for example, Examples 1 to 12 in Table 2, it was revealed that use of at least one selected from C.I. acid red 52, C.I. acid red 87, C.I. acid red 92, C.I. basic violet 10, basic violet 11, basic violet 11:1, C.I. acid yellow 3, and C.I. acid yellow 73 as a fluorescent dye achieved an excellent storage stability.

From, for example, Example 3 and Examples 1, 2, and 4 to 12 in Table 2, it was revealed that an excellent fixability was achieved when resin particles contained a urethane resin and an acrylic resin.

Aspects of the present disclosure are, for example, as follows.

<1> An ink including:

water;

a colorant; and an organic solvent, wherein the colorant is resin particles dyed with a fluorescent dye, wherein the resin particles contain a urethane resin, and wherein pH of the ink is from 9 through 11.

<2> The ink according to <1>, wherein an acid value of the urethane resin is 10 mgKOH/g or greater.

<3> The ink according to <1> or <2>, wherein the fluorescent dye is at least one selected from the group consisting of C.I. acid red 52, C.I. acid red 87, C.I. acid red 92, C.I. basic violet 10, basic violet 11, basic violet 11:1, C.I. acid yellow 3, and C.I. acid yellow 73.

<4> The ink according to any one of <1> to <3>, further including a polyacrylic acid salt having a weight average molecular weight of from 3,000 through 10,000.

TABLE 2

|  | Corrosion resistance | Fluorescent property | Storage stability | Fixability | Saturation | Water resistance |
|---|---|---|---|---|---|---|
| Ex. 1 | B | B | C | C | C | A |
| Ex. 2 | B | B | B | C | B | B |
| Ex. 3 | B | B | B | B | C | B |
| Ex. 4 | B | B | B | B | B | C |
| Ex. 5 | B | B | B | C | B | B |
| Ex. 6 | B | B | B | C | B | B |
| Ex. 7 | B | C | B | C | B | B |
| Ex. 8 | B | B | B | C | B | B |
| Ex. 9 | B | B | B | C | B | A |
| Ex. 10 | B | B | B | C | B | C |
| Ex. 11 | B | B | C | C | A | A |
| Ex. 12 | B | B | B | C | A | A |
| Comp. Ex. 1 | B | D | B | C | C | B |
| Comp. Ex. 2 | D | C | D | C | B | C |
| Comp. Ex. 3 | D | C | D | C | C | B |

<5> The ink according to any one of <1> to <4>,
wherein the resin particles contain a plurality of kinds of resins, and
wherein the resins include the urethane resin and an acrylic resin.

<6> The ink according to any one of <1> to <5>,
wherein the ink is a water-based fluorescent color ink.

<7> The ink according to any one of <1> to <6>,
wherein the ink is for inkjet.

<8> An ink stored container including:
the ink according to any one of <1> to <7>; and
a container,
wherein the ink is stored in the container.

<9> An inkjet printing method including
discharging the ink according to any one of <1> to <7> to print an image over a print medium.

<10> An inkjet printing apparatus including
an ink discharging unit configured to discharge the ink according to any one of <1> to <7> to print an image over a print medium.

The ink according to any one of <1> to <7>, the ink stored container according to <8>, the inkjet printing method according to <9>, and the inkjet printing apparatus according to <10> can solve the various problems in the related art and achieve the object of the present disclosure.

What is claimed is:

1. An ink; comprising:
water;
a colorant; and
are organic solvent,
wherein the colorant is resin particles dyed with a fluorescent dye, wherein the resin particles contain a urethane resin, wherein a volume average particle diameter of the resin particles is in a range from 5 nm to 200 nm,
wherein the resin particles form a film on a print medium upon evaporation of the organic solvent and water, and
wherein pH of the ink is from 9 through 11.

2. The ink according to claim 1,
wherein an acid value of the urethane resin is 10 mgKOH/g or greater.

3. The ink according to claim 1,
wherein the fluorescent dye is at least one selected from the group consisting of C.I. acid red 52, C.I. acid red 87, C.I. acid red 92, C.I. basic violet 10, basic violet 11, basic violet 11:1, C.I. acid yellow 3, and C.I. acid yellow 73.

4. The ink according to claim 1, further comprising
a polyacrylic acid salt having a weight average molecular weight of from 3,000 through 10,000.

5. The ink according to claim 1,
wherein the resin particles contain a plurality of kinds of resins, and
wherein the resins include the urethane resin and an acrylic resin.

6. The ink according to claim 1,
wherein the ink is a water-based fluorescent color ink.

7. The ink according to claim 1,
wherein the ink is for inkjet.

8. An ink stored container, comprising:
the ink according to claim; and
a container,
wherein the ink is stored in the container.

9. An inkjet printing method, comprising:
discharging an ink to print an image over a print medium,
wherein the ink comprises: water; a colorant; and an organic solvent,
wherein the colorant is resin particles dyed with a fluorescent dye,
wherein the resin particles contain a urethane resin,
wherein a volume average particle diameter of the resin particles is in a range from 5 nm to 200 nm,
wherein the resin particles form a film on the print medium upon evaporation of the organic solvent and water, and
wherein pH of the ink is from 9 through 11.

10. An inkjet printing apparatus, comprising:
an ink discharging unit configured to discharge an ink to print an image over a print medium,
wherein the ink comprises: water; a colorant; and an organic solvent,
wherein the colorant is resin particles dyed with a fluorescent dye,
wherein the resin particles contain a urethane resin,
wherein a volume average particle diameter of the resin particles is in a range from 5 nm to 200 nm,
wherein the resin particles form a film on the print medium upon evaporation of the organic solvent and water, and
wherein pH of the ink is from 9 through 11.

11. The ink according to claim 1, wherein the volume average particle diameter of the resin particles is in a range of from 10 nm to 100 nm.

12. The ink according to claim 1, wherein the organic solvent is selected from the group consisting of a polyvalent alcohol, a polyvalent alcohol alkyl ether, a polyvalent alcohol aryl ether, a nitrogen-containing heterocyclic compound, an amide, an amine, a sulfur-containing compound, propylene carbonate, and ethylene carbonate.

13. The ink according to claim 1, wherein a proportion of the fluorescent dye is a range of from 0.2% by mass to 2% by mass, relative to a total amount of the ink.

14. The ink according to claim 1, wherein a proportion of the resin particles is a range of from 0.5% by mass to 50% by mass, relative to a total amount of the ink.

15. The ink according to claim 1, wherein the ink comprises a dispersion aid.

16. The ink according to claim 1, wherein the ink comprises at least one further component selected from the group consisting of a surfactant, a foam suppressant, a permeation agent, a pH adjustor, a preservative, a fungicide, and a corrosion inhibitor.

17. The ink according to claim 1, comprising 0.5% by mass or less of a colorant other than the resin particles dyed with the fluorescent dye, relative to a total amount of the ink.

18. The ink according to claim 1, wherein the organic solvent is 1,3-butanediol or 2-ethyl-1,3-hexanediol.

* * * * *